United States Patent

Erickson

[15] 3,673,183
[45] June 27, 1972

[54] α-UREIDOCEPHALOSPORANIC ACID COMPOUNDS

[72] Inventor: Raymond Curry Erickson, Metuchen, N.J.
[73] Assignee: E. R. Squibb & Sons, Inc., New York, N.Y.
[22] Filed: Nov. 17, 1969
[21] Appl. No.: 877,488

[52] U.S. Cl. .................................260/243 C, 424/246
[51] Int. Cl. .................................C07d 99/24
[58] Field of Search .............................260/243 C

[56] References Cited

UNITED STATES PATENTS

| | | | |
|---|---|---|---|
| 3,457,257 | 7/1969 | Hanessian et al. | 260/239.1 |
| 3,466,275 | 9/1969 | Morin et al. | 260/243 C |
| 3,487,079 | 12/1969 | Sheehan | 260/243 C |
| 3,497,504 | 2/1970 | Wagner | 260/239.1 |
| 3,352,851 | 11/1967 | Fosker | 260/239.1 |
| 3,485,819 | 12/1969 | Weisenborn et al. | 260/239.1 |

*Primary Examiner*—Nicholas S. Rizzo
*Attorney*—Lawrence S. Levinson, Merle J. Smith and Donald J. Perrella

[57] ABSTRACT

New α-ureidocephalosporanic acid compounds of the general formula

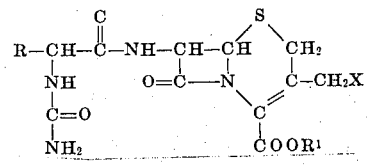

are effective as antibacterial agents and show improved results against certain hard to control organisms.

7 Claims, No Drawings

α-UREIDOCEPHALOSPORANIC ACID COMPOUNDS

SUMMARY OF THE INVENTION

This invention relates to new antibacterial α-ureidocephalosporanic acid compounds of the formula (I)
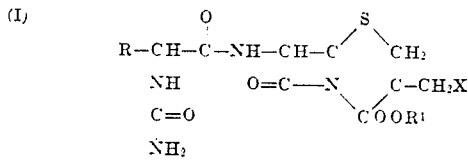

and physiologically acceptable salts thereof, which are antibacterial agents effective against a variety of bacterial pathogens, both gram-positive and gram-negative bacteria, and which show better results than known agents against certain hard to control genera.

Derivatives of cephalosporanic acid are known and have been described as antibacterial agents. There is, however, a continuing need for new antibacterial agents which are effective against additional gram-positive and gram-negative organisms, are effective against resistant organisms or which may be turned to when resistance develops, or which are particularly effective against certain hard to control organisms. It has now been found that the new compounds of this invention, in addition to being active against a broad spectrum of gram-positive and gram-negative organisms, show particular results against hard to control organisms such as members of the genera *Proteus*, *Salmonella* and *Streptococcus*.

R in formula I represents hydrogen or an organic radical such as an alkyl, cycloalkyl and unsaturated cycloalkyl, aryl or aralkyl, as well as substituted members thereof. $R^1$ is hydrogen, lower alkyl or a salt forming ion. X is hydrogen, hydroxyl, lower alkanoyloxy, aroyloxy, e.g., benzoyloxy or aralkanoyloxy, e.g., phenyl-lower alkanoyloxy like phenylacetoxy, the radical of a nitrogen base or a quaternary ammonium radical. In addition X and $R^1$ may represent a bond linking carbon and oxygen in a lactone ring.

DETAILED DESCRIPTION OF THE INVENTION

The symbol R in formula I represents, more particularly, an alkyl group, e.g., a branched or straight chain saturated aliphatic hydrocarbon group having up to about 12 carbons in the chain. These include the preferred lower alkyl groups having one to seven carbon atoms such as methyl, ethyl, propyl, isopropyl, butyl, isobutyl, t-butyl, amyl and the like, as well as longer chain groups such as octyl, nonyl and decyl. Cycloalkyl groups also represented by R include cycloaliphatic groups having three to seven carbons in the ring such as cyclopropyl, cyclobutyl, cyclopentyl, cyclohexyl and cycloheptyl. The cyclic groups may also be cycloalkenyl and cycloalkadienyl groups of the same type, e.g., cyclobutenyl, cyclopentenyl, cyclohexenyl, cyclopentadienyl, cyclohexadienyl, etc. The double bond or bonds may be variously located. A particularly preferred radical, as discussed later, is the 1,4-cyclohexadienyl group. These may be simply substituted with one to three groups such as halogen, lower alkyl or lower alkoxy.

R may also represent an aromatic group, particularly aryl radicals such as phenyl or naphthyl as well as aralkyl radicals containing such as an aryl group attached to a lower alkyl group. The rings may also bear one to three simple substituents such as halogen, hydroxy, lower alkyl, lower alkoxy, lower alkanoyl or lower alkanoyloxy.

As in general throughout this discussion, halogen refers to the four common halogens, but chlorine and bromine are preferred, lower alkyl refers to one to seven carbon aliphatic radicals such as those referred to previously, lower alkoxy refers to ether groups, e.g., methoxy, ethoxy, propoxy, isopropoxy and the like, lower alkanoyl and lower alkanoyloxy refer to radicals containing the acyl group of the one to seven carbon lower fatty acids, e.g., acetyl, proionyl, butyryl, isobutyryl, acetoxy, propionyloxy, butyryloxy, etc.

Illustrative of the aromatic radicals represented by R are phenyl, o-, m- and p-chlorophenyl, o-, m- and p-bromophenyl, 3,4-dichlorophenyl, 3,5-dibromophenyl, p-hydroxyphenyl, o-, m- and p-tolyl, p-methoxyphenyl, 3,4,5-trimethoxyphenyl, p-acetoxyphenyl, naphthyl and naphthyl similarly substituted as the phenyl groups, and phenyl-lower alkyl such as benzyl, phenethyl, phenylisopropyl, o-, m- and p-chlorobenzyl, o-, m- and p- bromophenyl, 3,4-dichlorobenzyl, 3,5-diethylbenzyl, 3,4,5-tri-chlorophenyl, etc.

$R^1$ represents hydrogen or an ester or salt forming radical. The esters are preferably lower alkyl esters, i.e., $R^1$ represents a lower alkyl group of the type defined previously, preferably methyl or ethyl. The salt forming ion may be a metal ion, e.g., aluminum or an alkali metal such as sodium or potassium, or an alkaline earth metal such as calcium or magnesium, or the radical of an organic base such as dibenzylamine, N,N-dibenzylethylenediamine or the like. X is hydrogen, lower alkanoyloxy, e.g., acetoxy, propionyloxy, or the like or the radical of an amine, e.g., an alkylamine like methylamine, ethylamine, dimethylamine, triethylamine, dibenzylamine, N,N'- dibenzylpyridinium, 1-quinolinium, 1-picolinium, etc., In addition, X and R' may represent a monovalent bond linking carbon and oxygen in a lactone ring.

Preferred are compounds within the above described group having the formula (II)
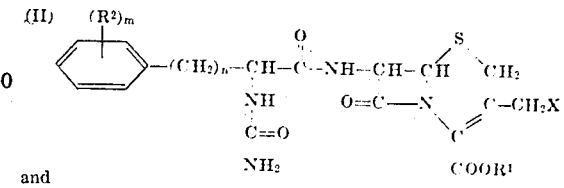

and (III)
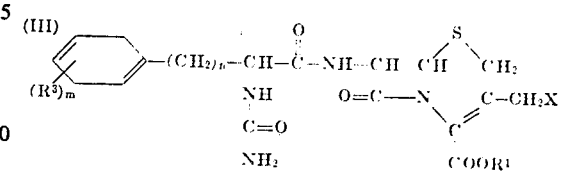

$R^1$ and X have the same meaning described above but especially X is hydrogen or acetoxy, and $R^1$ is hydrogen or sodium.

$R^2$ is hydrogen or a hydroxy, halogen, lower alkyl, lower alkoxy, lower alkanoyl or lower alkanoyloxy group such as those described above. $R^3$ is hydrogen, lower alkyl or lower alkoxy. $m$ is 1, 2 or 3 and $n$ is 0, 1, 2, 3 or 4.

The compounds of formula I are produced by first forming a compound of the formula (IV)
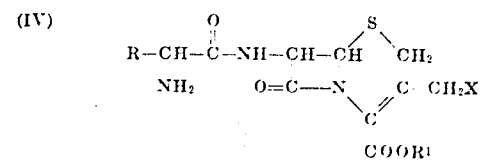

and then treating the compound of formula IV with a cyanate, e.g., an alkali metal cyanate such as potassium cyanate, or with carbamyl phosphate.

The substances of formula IV, most of which are known compounds, are produced from a 7-aminocephalosporanic acid compound of the formula (V)
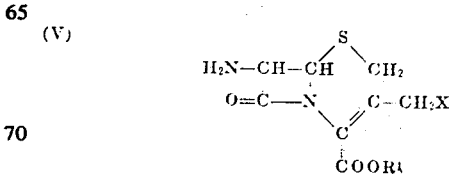

wherein $R^1$ and X have the meanings already described. These are obtained as described in U.S. Pat. No. 3,391,141. The compound of formula V may also be used in the form of derivatives such as aldimines or Schiff's bases formed with the amino group. Such derivatives are frequently useful because of their stability and in many cases give improved yields and more uniform reactions.

The compound of the foregoing formula is coupled with an α-amino acid of the formula (VI) 

where R has the meaning described above. For an efficient process, the amino group is best protected before coupling. Protecting groups which may be used to protect the amino group during the reaction of the acid compound with the reaction partner of formula V include, for example, triphenylmethyl, t-butoxycarbonyl, β,β,β-trichloroethoxycarbonyl, 4-oxo-2-pentenyl-2, 1-carbomethoxy-1-propenyl-2, carbobenzoxy or the like. These are formed by reacting the acid of formula VI with a compound such as triphenylmethylchloride, t-butyl azidoformate, β,β,β-trichloroethyl chloroformate, acetylacetone, methylacetoacetate or the like. After the coupling reaction, if the protecting group is still present, it is removed, e.g., by treatment with aqueous acetic acid, trifluoroacetic acid, zinc-acetic acid, or aqueous mineral acid, respectively, to give the compound with the free or monosubstituted amino group.

Alternatively the amino group may be protected by protonation as the salt form before and during the subsequent coupling reaction.

The coupling reaction is preferably effected by conversion of the acid to an activated form such as the acid chloride, bromide, azide, p-nitrophenyl ester, anhydride, or mixed anhydride, Leuch's anhydride or by condensing in the presence of a carbodiimide such as dicyclohexylcarbodiimide.

The product of formula IV, thus obtained, is dissolved or suspended in aqueous medium and the cyanate or carbamyl phosphate is slowly added. Heat, e.g., up to about 80° C., may be used to accelerate the reaction. The pH of the reaction mixture is preferably kept on the acid side, e.g., within the range of about 5 to 6.9. The product may usually be precipitated by acidification and chilling.

As an alternative, the compound of formula VI may first be reacted with the cyanate or carbamyl phosphate under the conditions described above and then the reaction with the compound of formula V is carried out.

The starting α-amino compound for the preparation of preferred products of formula III are prepared by reducing a compound of the formula (VII) 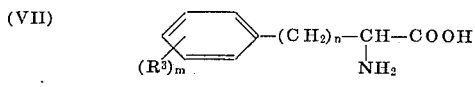

or a metal salt thereof, e.g., alkali metal salt, alkaline earth metal salt or the like, with sodium or lithium in liquid ammonia followed by treatment with an alcohol such as ethanol or t-butanol, followed by treatment with ammonium chloride, or other amine hydrochloride. Derivatives of compounds of formula VII in which the amino group is protected may also be treated in an analogous manner.

The products of this invention form salts which are also part of the invention. Basic salts form with the acid moiety as discussed above when the symbol $R^1$ is hydrogen.

It will be appreciated that certain of the compounds of this invention exist in various states of solvation as well as in different optically active forms. The various forms as well as their mixtures are within the scope of this invention.

Ordinarily the new compounds of this invention derived from D-α-amino acids of formula VI or derivatives thereof are more active than the corresponding compound derived from the L-form or DL-form. The configuration of the α-carbon of the α-amino acid used in the synthesis is retained in the product.

The compounds of this invention have a broad spectrum of antibacterial activity against both gram positive and gram negative organisms such as *Staphylococcus aureus*, *Salmonella schottmuelleri*, *Pseudomonas aeruginosa*, *Proteus vulgaris*, *Escherichia coli* and *Streptococcus pyogenes*. They may be used as antibacterial agents in a prophylactic manner, e.g., in cleaning or disinfecting compositions, or otherwise to combat infections due to organisms such as those named above, and in general may be utilized in a manner similar to cephalosporin C, cephalothin and other cephalosporins. For example, a compound of formula I or a physiologically acceptable salt thereof may be used in various animal species in an amount of about 1 to 200 mg./kg. daily, orally or parenterally, in single or two to four divided doses to treat infections of bacterial origin. By way of illustration the $PD_{50}$ subcutaneously in mice in a single administration is of the order of 5 mg./kg. against *Streptococcus*.

Up to about 600 mg. of a compound of formula I or a salt thereof may be incorporated in an oral dosage form such as tablets, capsules or elixirs or in an injectable form in a sterile aqueous vehicle prepared according to conventional pharmaceutical practice.

In cleaning or disinfecting compositions, e.g., in barns or dairy equipment, a concentration of about 0.01 to 1 percent by weight of such compounds admixed with, suspended or dissolved in conventional inert dry or aqueous carriers for application by washing or spraying may be used.

They are also useful as nutritional supplements in animal feeds.

The following examples are illustrative. All temperatures are on the centigrade scale.

EXAMPLE 1

7-(D-α-ureidophenylacetamido)cephalosporanic acid, potassium salt a. 600 mg. of N-carbobenzoxy-D-phenylglycine (prepared by the reaction of D-phenylglycine with carbobenzoxy chloride) are dissolved in 10 ml. of dry tetrahydrofuran. The solution is cooled in an ice-salt bath. To this are added 0.29 ml. of triethylamine with stirring over a period of 10 minutes, followed by 0.29 ml. of isobutyl chloroformate. Stirring is continued for 10 minutes at —5° C. 570 mg. of 7-aminocephalosporanic acid (7-ACA) and 0.29 ml. of triethylamine are dissolved in 5 ml. of tetrahydrofuran and 5 ml. of water, and the solution is centrifuged. The clarified solution is cooled in ice and slowly added to the reaction mixture, and stirring is continued in the ice bath for one-half hour, followed by 1 hour at room temperature. The reaction product mixture is evaporated under vacuum to a semi-solid residue. 35 ml. of water and a few drops of triethylamine are added to the residue to raise the pH to 8. The aqueous solution is then extracted successively with 50 ml. and 35 ml. portions of ethyl acetate, the pH being adjusted to 2 at each extraction with hydrochloric acid. The extracts are combined, filtered, dried over sodium sulfate, stripped of solvent, and evaporated under vacuum to obtain 7-(N-carbobenzoxy-D-α-amino-phenylacetamide)cephalosporanic acid as a yellow-white amorphous solid.

1.0 g. of this product is dissolved in 150 ml. of warm 95 percent ethyl alcohol. To the solution is added 1.0 g. of 5 percent palladium on carbon catalyst, and the mixture is hydrogenated at room temperature and atmospheric pressure. The hydrogenation product is filtered, the solid phase is suspended in ethyl acetate and water and adjusted to pH 2 with hydrochloric acid. The suspension is filtered, the aqueous phase is separated from the filtrate and evaporated under vacuum to obtain 7-(D-α-aminophenylacetamido)-cephalosporanic acid.

b. To a suspension of 75 mg. of 7-(D-α-aminophenyl-acetamido)cephalosporanic acid in 7.5 ml. of water there are added 150 mg. of potassium cyanate with stirring. The reaction mixtures, which soon clears, is incubated at 22°-24° and the pH maintained between 5.0 and 6.9 by frequent dropwise additions of 1.0 N hydrochloric acid with stirring. After 5 hours, the solution is adjusted to 10.0 ml., acidified to pH 1.8 with 1.0 N hydrochloric acid, and extracted successively with four 75 ml. portions of ethyl acetate. The ethyl acetate is washed four times with 10 ml. portions of water adjusted to pH 2.0 with hydrochloric acid, filtered, and evaporated at 10°–20 C. in vacuo to give the free acid as an amorphous white powder.

The potassium salt is obtained by suspending the powder in 80 ml. of water and treating with an equivalent of 0.1 N. aqueous potassium hydroxide solution added with vigorous stirring. The solution is evaporated to dryness in vacuo at 25°–30° C. to yield 80 mg. of 7-(D-α-ureidophenylacetamido)cephalosporanic acid, potassium salt.

EXAMPLE 2

7-[D-2-ureido-2-(1,4-cyclohexadien-1-yl)acetamido]cephalosporanic acid, potassium salt a. D-2-Amino-2-(1,4-cyclohexadienyl)acetic acid A solution of 11.0 g. (72.7 mmole) of D-phenylglycine in 900 ml. distilled ammonia (which has been treated with 45 mg. lithium after distillation to destroy traces of moisture) is slowly diluted with 370 ml. dry t-butyl alcohol.

Over a period of 2 hours, 1.65 g. lithium (3.27 eq.) is added in small portions until a permanent blue color is obtained. The blue reaction mixture is then treated with 38 g. of triethylamine hydrochloride. The ammonia is allowed to evaporate at room temperature overnight and the residual solvent is evaporated at reduced pressure. The white residue is taken up in a small amount of methanol-water and added to 4 l. of cold 1:1 chloroform acetone to precipitate the crude product. After 20 minutes stirring the suspension is filtered and the white filter cake dried in vacuo; the filter cake is then pulverized and submitted once more to the precipitation process from 1:1 chloroform-acetone. D-2-amino-2-(1,4-cyclohexadien-1-yl)acetic acid is obtained as a white crystalline product, m.p. 297° (dec.)

b. Methyl acetoacetic ester enamine of N-2-amino-2-(1,4-cyclohexadienyl)acetic acid, sodium salt 306 mg. D-2-amino-2-(1,4-cyclohexadienyl)acetic acid (2.00 mmoles) are dissolved by warming in a solution of 108 mg. of $NaOCH_3$ (2.00 mmoles) in 4.3 ml. reagent grade MeOH. 255 mg. (0.24 ml.–2.20 mmoles) methyl acetoacetate are added and the mixture refluxed for 45 minutes. The MeOH is almost totally stripped off in vacuo. 5 ml. benzene are added and distilled off to a small residual volume. The addition and distillation of benzene is repeated to insure complete removal of the MeOH and water. The product crystallizes out overnight from a small residual volume of benzene. It is filtered off, washed with benzene, and dried in vacuo.

c. 7-[D-2-Amino-2-(1,4-cyclohexadien-1-yl)acetamido]cephalosporanic acid 452 mg. of 7-aminocephalosporanic acid (7–ACA) are stirred well in 2.5 ml. of water while 0.23 ml. triethylamine are gradually added with the ph kept under 8.0. Final pH is 7.4; 0.85 ml. acetone are added and the solution is kept at −10° C.

469 mg. methyl acetoacetate enamine of D-2-amino-2-(1,4-cyclohexadienyl)acetic acid, sodium salt, are stirred in 4.25 ml. acetone at −20° C. A microdrop of N-methylmorpholine is added followed by the slow addition of 198 mg. of ice cold ethyl chloroformate. 0.43 ml. of water is added at this point. The reaction mixture is stirred for 10 minutes at −20° C.

The solution of mixed anhydride is then added to the 714 ACA solution. The solution is stirred for 30 minutes at −10° C., then raised to room temperature, acidified to pH 2.0 with diluted HCl and, with good stirring the pH is kept at that level for 10 minutes.

The solution is then extracted with 5 ml. xylene. The aqueous layer is layered with 5 ml. methyl isobutyl ketone and the pH adjusted to 5.0 with 1 N NaOH and chilled overnight. The resulting crystals are filtered off, washed with water and air dried.

d. 7-[D-2-ureido-2-(1,4-cyclohexadien-1-yl)acetamido]cephalosporanic acid, potassium salt By substituting the product of part c for the 7-(D-α-aminophenylacetamido)cephalosporanic acid in the procedure of Example 1b, 7-[D-2-ureido-2-(1,4-cyclohexadien-1-yl)acetamido]-cephalosporanic acid and its potassium salt are obtained.

EXAMPLE 3

7-(D-α-ureidophenylacetamido)-3-desacetoxycephalosporanic acid, potassium salt 7-amino-3-desacetoxycephalosporanic acid (7–ADCA) is produced as described in U.S. Pat. No. 3,391,141. 7-(D-α-aminophenylacetamido)-desacetoxycephalosporanic acid is produced by substituting 7–ADCA for the 7–ACA in the procedure of Example 1a. Then by substituting this product for the 7-(D-α-aminophenylacetamido)cephalosporanic acid in the procedure of Example 1b, 7-(D-α-ureidophenylacetamido)-3-desacetoxycephalosporanic acid, potassium salt, is obtained.

EXAMPLE 4

7-[D-α-ureido-(1,4-cyclohexadien-1-yl)acetamido]-3-desacetoxy-cephalosporanic acid is obtained by the procedure of Example 2 by substituting 7–ADCA for 7–ACA in part c. Then utilizing this product in part, d, 7-[D-α-ureido-(1,4-cyclohexadien-1-yl)acetamido]-3-desacetoxycephalosporanic acid, potassium salt is obtained.

EXAMPLE 5

7-[DL-2-ureido-3-phenylpropionamido]cephalosporanic acid, potassium salt

By substituting DL-phenylalanine for the D-phenylglycine in part a and thereafter following the complete procedure of Example 1, the above named compound is obtained.

EXAMPLE 6

7-[D-2-ureido-3-(1,4-cyclohexadien-1-yl)propionamido]cephalosporanic acid a. D-2-amino-3-(1,4-cyclohexadien-1-yl)propionic acid 12.0 g. of D-phenylalanine are substituted for the D-phenylglycine in the procedure of Example 2 to obtain D-2-amino-3-(1,4cyclohexadien-1-yl)propionic acid as a white powder.

b. Methyl acetoacetate ester enamine of D-2-amino-3-(1,4-cyclohexadienyl)propionic acid sodium salt This product is obtained by substituting 330 mg. of the product of part a above in the procedure of Example 2b.

c. 7-[D-2-amino-3-(1,4-cyclohexadien-1-yl)propionamide]-cephalosporanic acid 493 mg. of methyl acetoacetate enamine of D-2-amino-3-(1,4-cyclohexadienyl)propionic acid sodium salt (1.715 mmole) are substituted for the methyl acetoacetate enamine of D-2-amino-2-(1,4-cyclohexadienyl)acetic acid sodium salt in the procedure of Example 2c.

The mixed anhydride is added to the 7–ACA, stirred for 30 minutes at −10° C., brought to room temperature, acidified to pH 2.0 as in Example 2c. The solution is then extracted with 5 ml. of xylene. The aqueous layer is layered with 5 ml. of methyl isobutyl ketone and the pH is adjusted to 5.0 with 1 N NaOH. The aqueous layer is then lyophilized to give 7-[D-2-amino-3-(1,4-cyclohexadien-1-yl)cephalosporanic acid. d. By utilizing the product of part c in the procedure of Example 2d, 7-[D-2-ureido-3-(1,4-cyclohexadien-1-yl)propionamido]cephalosporanic acid is obtained.

EXAMPLE 7

7-[D-2-ureido-2-(4-methoxy-1,4-cyclohexadien-1-yl)propionamido]-cephalosporanic acid, potassium salt crystalline By substituting 14.2 g. (72.7 mmole) of D-O-methyltyrosine for the phenylglycine in the procedure of Example 2a, D-2-amino-3-(4-methoxy-1,4-cyclohexadienyl)propionic acid is obtained as a white crysalline product, m.p. 227° C.

Then by using this compound in the procedure of Example 2, parts b, c and d, the above named product is obtained.

EXAMPLE 8

7-[D-2-ureido-3-(1,4-cyclohexadien-1-yl)propionamido]-3-desacetoxy-cephalosporanic acid By utilizing the procedure of Example 6, but substituting 356 mg. of 3-deacetoxy-7-aminocephalosporanic acid for the 7–ACA, the above product is obtained.

EXAMPLE 9

7-[D-2-ureido-3-(4-methoxy-1,4-cyclohexadien-1-yl)propionamido]-3-deacetoxycephalosporanic acid By utilizing 544 mg. of methyl acetoacetate enamine of D-2-amino-3-(4-methoxy-1,4-cyclohexadienyl)propionic acid sodium salt of Example 7 and 3-deacetoxy-7-aminocephalosporanic acid, as in Example 2, the above product is obtained.

EXAMPLE 10

7-[2-ureido-2-(1,4-cyclohexadien-1-yl)acetamideo]-3-(1-pyridinium-methyl)-3-cephem-4-carboxylate A 0.1 molar solution of the 7-[2-ureido-2-(1,4-cyclohexadienyl)-acetamido]cephalosporanic acid (as prepared in Example 2d) is treated with 0.5 mole pyridinium acetate at pH 7 (the pH is adjusted to 7 with a few drops of aqueous pyridine solution) for several hours at room temperature. A rapid solvolysis occurs which can be followed by paper chromatography; when the disappearance of the starting material is complete, lyophilization provides good yields of the product in the form of the acetate as a fine, white powder.

EXAMPLE 11

7-[2-ureido-3-(1,4-cyclohexadien-1-yl)propionamido]-3-(1-pyridinium-methyl)-3-cephem-4-carboxylate This compound is obtained as the acetate by utilizing the procedure of Example 10 employing 7-[2-ureido-3-(1,4-cyclohexadien-1-yl)propionamido]cephalosporanic acid.

EXAMPLE 12

7-[2-ureido-3-(4-methoxy-1,4-cyclohexadien-1-yl)propionamido]-3-(1-pyridiniummethyl)-3-cephem-4-carboxylate This compound is obtained as the acetate by utilizing the procedure of Example 10 employing 7-[2-ureido-3-(4-methoxy-1,4-cyclohexadien-1-yl)propionamido]cephalo sporanic acid.

EXAMPLE 13

7-[2-ureido-2-(1,4-cyclohexadien-1-yl)acetamido]-3-desacetoxy-cephalosporanic acid lactone A 0.1 molar solution of the 7-[2-ureido-2-(1,4-cyclohexadien-1-yl)acetamido]cephalosporanic acid is acidified with dilute hydrochloric acid to pH 1–3 and maintained at that point until paper chromatography shows absence of starting material; lyophilization gives the product as a powder which is further purified by crystallization from aqueous ethanol.

Example 14

7-[2-ureido-3-(1,4-cyclohexadien-1-yl)propionamido]-3-desacetoxy-cephalosporanic acid lactone The use of 7-[2-ureido-3-(1,4-cyclohexadien-1-yl)propionamido]-cephalosporanic acid in the procedure of Example 13 gives the lactone as the hydrochloride.

EXAMPLE 15

7-[DL-2-ureido-2-(4-methoxy-1,4-cyclohexadien-1-yl)acetamido]-cephalosporanic acid, potassium salt By making the substitution of DL-4-methoxyphenyl glycine as in Example 7 and further following the procedure of Example 2, the above product is obtained.

EXAMPLE 16

7-(2-ureidoisovaleramido)cephalosporanic acid

By substituting isovaline for the phenylglycine in the procedure of Example 1, the above product is obtained.

EXAMPLE 17

7-(2-ureido-n-valeramido)cephalosporanic acid

By substituting valine for the phenylglycine in the procedure of Example 1, the above product is obtained.

EXAMPLE 18

7-(2-ureidocaproamido)cephalosporanic acid

By substituting norleucine for the phenyl glycine in the procedure of Example 1, the above product is obtained.

EXAMPLE 19

7-(2-ureido-2-cyclohexylacetamido)cephalosporanic acid

By substituting α-cyclohexylglycine for the phenyl glycine in the procedure of Example 1, the above product is obtained.

EXAMPLE 20

7-[DL-2-ureido-2-(4-methylphenyl)acetamido]cephalosporanic acid, potassium salt

By substituting (4-methylphenyl)glycine for the phenyl glycine in the procedure of Example 1, the above product is obtained.

EXAMPLE 21

7-(DL-2-ureido-3-phenylpropionamido)cephalosporanic acid a. DL-2-ureido-3-phenylpripionic acid is formed by treating DL-phenylalanine with potassium cyanate according to the procedure of Example 1b.

b. A solution of 124 mg. of DL-2-ureido-3-phenylpropionic acid and 35 mg. of sodium bicarbonate in 10 ml. of water is treated with a solution of 240 mg. of dicyclohexylcarbodiimide in 40 ml. of acetate. After 15 minutes at 24°, 100 mg. of 7-aminocephalosporanic acid are added with stirring and the reaction mixture is then set aside for 3 hours. The acetone is removed in vacuo at 30° and the remaining aqueous mixture is freed of dicyclohexylurea and other insoluble material by centrifugation. The centrifugate is adjusted to pH 2.0 with 1.0 N. hydrochloric acid and repeatedly extracted with ethyl acetate until the aqueous phase is essentially devoid of bioactivity as shown by bioautographed samples. The ethyl acetate fractions are washed with water, adjusted to pH 2.0 with hydrochloric acid, pooled, dried in vacuo at 30° and then to constant weight over calcium chloride to yield 158 mg. of 7-(DL-2-ureido-3-phenylpropionamide)cephalosporanic acid.

EXAMPLE 22

7-(L-2-ureido-3-phenylpropionamide)cephalosporanic acid

By substituting 124 mg. of L-2-ureido-3-phenylpropionic acid for the DL-form in the procedure of Example 21, the above product is obtained.

EXAMPLE 23

7-[L-2-ureido-3-(4-hydroxyphenyl)propionamide]cephalosporanic acid

N-carbamyl-L-tyrosine is obtained from L-tyrosine as described in Example 21a. By substituting 172 mg. of this compound in the procedure of Example 21b, the above procedure is obtained.

EXAMPLE 24

7-(L-2-ureidopropionamido)cephalosporanic acid a. By substituting L-α-alanine for the DL-phenylalanine and following the procedure of Example 21a, N-carbamyl-L-α-alanine is obtained.

b. 43 mg. of the product of part a and 20 mg. of sodium bicarbonate in 10 ml. of water are treated with a solution of 152 mg. of dicyclohexylcarbodiimide in 40 ml. of acetone. After 15 minutes at 24°, 100 mg. of 7–ACA are added with stirring and the reaction mixture is then set aside of 3 hours. The acetone is removed in vacuo at 30° and the remaining aqueous mixture is freed of dicyclohexylurea and other insolubles by centrifugation. The centrifugate is adjusted to pH 2.0 with 1.0N hydrochloric acid and repeatedly extracted with ethyl acetate. The ethyl acetate fractions are washed with water, adjusted to pH 2.0 with hydrochloric acid, combined and dried in vacuo at 30° and then to constant weight over calcium chloride to obtain the above product.

EXAMPLE 25

7-(DL-2-ureido-n-butyramido)cephalosporanic acid 49 mg. of N-carbamyl-DL-α-amino-n-butyric acid obtained as in Example 24a and used in the procedure of Example 24b gives the above product.

EXAMPLE 26

7-(DL-2-ureidovaleramido)cephalosporanic acid 56 mg. of N-carbamyl-DL-norvaline obtained as in Example 24a and used in the procedure of Example 24b, gives the above product.

EXAMPLE 27

7-(DL-2-ureido-3-hydroxypropionamido)cephalosporanic acid 51 mg. of N-carbamyl-DL-serine obtained as in Example 24a and used in the procedure of Example 24b gives the above product.

EXAMPLE 28

7-(DL-2-ureido-3-hydroxybutyramido)cephalosporanic acid 57 mg. of N-carbamyl-DL-threonine obtained as in Example 24a and used in the procedure of Example 24b gives the above product.

EXAMPLE 29

A sterile powder for reconstitution for use intramuscularly is prepared from the following ingredients which supply 1,000 vials each containing 250 mg. of active ingredient:

| | |
|---|---|
| 7-(D-α-ureidophenylacetamido) cephalosporanic acid, sterile | 250 gm. |
| Lecithin powder, sterile | 50 gm. |
| Sodium carboxymethylcellulose, sterile | 20 gm. |

The sterile powders are aseptically blended and filled into sterile vials, and sealed. The addition of 1 ml. of water for injection to the vial provides a suspension for intramuscular injection.

EXAMPLE 30

A preformed suspension is prepared from the following ingredients which supply 1,000 vials each containing 300 mg. of active ingredient in 1 ml. of water for intramuscular injection:

| | | |
|---|---|---|
| 7-[D-2-ureido-2-(1,4-cyclohexadien-1-yl)acetamido]- cephalosporanic acid, sterile | | 300 gm. |
| Lecithin, sterile | | 60 gm. |
| Sodium carboxymethylcellulose, sterile | | 10 gm. |
| Acetate buffer, sterile | pH 4.5 | |
| Methyl paraben, sterile | | 1.2 gm. |
| Propyl paraben, sterile | | 0.2 gm. |
| Water for injection | qs | 1 liter |

The parabens are dissolved in the acetate buffer and mixed with the water for injection. The lecithin and sodium carboxymethylcellulose are added and dissolved. The active compound is then added with stirring to make a homogeneous suspension. The suspension is filled into sterile vials each containing 1 ml., sealed and stored under refrigeration.

What is claimed is:

1. A compound of the formula $$R-CH-C(O)-NH-CH-CH \begin{array}{c} S \\ \diagup \quad \diagdown \\ \end{array} CH_2$$
$$\begin{array}{ccc} | & | & | \\ NH & O=C-N & C-CH_2X \\ | & \diagdown \diagup & \\ C=O & C & \\ | & \| & \\ NH_2 & COOR^1 \end{array}$$

wherein R is hydrogen, alkyl, cycloalkyl having three to seven carbon atoms and up to two double bonds, aryl or aralkyl, $R^1$ is hydrogen, lower alkyl, or a salt forming ion, X is hydrogen, hydroxy, lower alkanoyloxy, aroyloxy, aralkanoyloxy, the radical of a nitrogen base or a quaternary ammonium radical or together X and $R^1$ are a bond joining carbon and oxygen in a lactone ring, each of the alkyl, aryl and alkanoyl radicals in the foregoing groups being respectively, alkyl of up to seven carbon atoms phenyl, or naphthyl substituted with one to three of the groups halogen, hydroxy, lower alkyl, lower alkoxy, lower alkanoyl or lower alkanoyloxy, and alkanoyl of up to seven carbon atoms, and salts thereof.

2. A compound of the formula $$(R^2)_m \diagdown \diagup (CH_2)_n-CH-C(O)-NH-CH-CH \begin{array}{c} S \\ \diagup \quad \diagdown \\ \end{array} CH_2$$
$$\begin{array}{ccc} | & | & | \\ NH & C-N & C-CH_2X \\ | & \diagdown \diagup & \\ C=O & O & C \\ | & & \| \\ NH_2 & & COOR^1 \end{array}$$

wherein X and $R^1$ are as defined in claim 1, $R^2$ is hydrogen, hydroxy, halogen, lower alkyl, lower alkoxy, lower alkanoyl or lower alkanoyloxy, m is 1, 2 or 3 and n is 0, 1, 2, 3 or 4, and salts thereof.

3. A compound of the formula $$(R^3)_n \diagdown \diagup (CH_2)_n-CH-C(O)-NH-CH-CH \begin{array}{c} S \\ \diagup \quad \diagdown \\ \end{array} CH_2$$
$$\begin{array}{ccc} | & | & | \\ NH & C-N & C-CH_2X \\ | & \diagdown \diagup & \\ C=O & O & C \\ | & & \| \\ NH_2 & & COOR^1 \end{array}$$

wherein X and $R^1$ are as defined in claim 1, $R^3$ is hydrogen, lower alkyl or lower alkoxy, m is 1, 2 or 3 and n is 0, 1, 2, 3 or 4, and salts thereof.

4. A compound as in claim 2 wherein $R^1$ and $R^2$ each is hydrogen, X is acetoxy and n is 0.

5. A compound as in claim 2 wherein $R^1$, $R^2$ and X each is hydrogen and n is 0.

6. A compound as in claim 3 wherein $R^1$ and $R^3$ each is hydrogen, X is acetoxy and n is 0.

7. A compound as in claim 3 wherein $R^1$, $R^3$ and X each is hydrogen and n is 0.

* * * * *

UNITED STATES PATENT OFFICE
CERTIFICATE OF CORRECTION

Patent No. 3,673,183                          Dated June 27, 1972

Inventor(s) Raymond Curry Erickson

It is certified that error appears in the above-identified patent and that said Letters Patent are hereby corrected as shown below:

The formula in the abstract should read

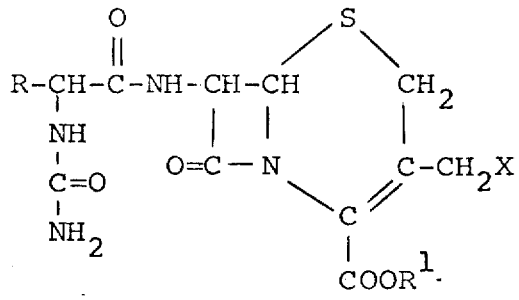

Column 1, formula 1 should read

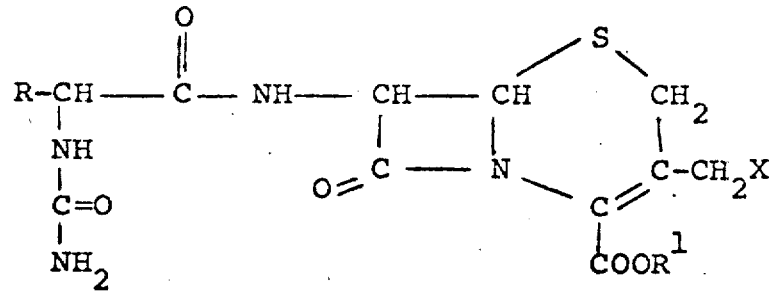

Column 4, line 60, "acetamide" should be --acetamido--; line 75, mixtures should be singular.
Column 6, after Example 4 insert -- 7-[D-α-ureido-(1,4-cyclohexadien-1-yl)acetamido]-3-desacetoxycephalosporanic acid, potassium salt--; line 66 delete --crystalline--; line 70, correct the spelling of "crystalline".
Column 8, line 16, "phenylpripionic" should be -- phenylpropionic--; line 34, "phenylpropionamide" should be --phenylpropionamido--; line 36, "phenylpropionamide" should be --phenylpropionamido--; line 41, "propionamide" should be -- propionamido--; line 57, "of" should be --for--.

Signed and sealed this 27th day of November 1973.

(SEAL)
Attest:

EDWARD M. FLETCHER, JR.                    RENE D. TEGTMEYER
Attesting Officer                          Acting Commissioner of Patents